(12) United States Patent
Commaret et al.

(10) Patent No.: US 7,926,281 B2
(45) Date of Patent: Apr. 19, 2011

(54) DEVICE FOR INJECTING A MIXTURE OF AIR AND FUEL, AND COMBUSTION CHAMBER AND TURBOMACHINE PROVIDED WITH SUCH A DEVICE

(75) Inventors: Patrice Andre Commaret, Rubelles (FR); Dominique Guezengar, Arpajon (FR); Didier Hippolyte Hernandez, Quiers (FR); Romain Nicolas Lunel, Brie Comte Robert (FR); Pascale Rollet, Le Plessis Pate (FR)

(73) Assignee: SNECMA, Paris (FR)

( * ) Notice: Subject to any disclaimer, the term of this patent is extended or adjusted under 35 U.S.C. 154(b) by 966 days.

(21) Appl. No.: 11/768,421

(22) Filed: Jun. 26, 2007

(65) Prior Publication Data

US 2008/0000234 A1 Jan. 3, 2008

(30) Foreign Application Priority Data

Jun. 29, 2006 (FR) ...................................... 06 05849

(51) Int. Cl.
*F02C 1/00* (2006.01)
*F02G 3/00* (2006.01)
(52) U.S. Cl. ............................... 60/748; 60/737; 60/740
(58) Field of Classification Search .................... 60/737, 60/748, 740, 746, 747, 804
See application file for complete search history.

(56) References Cited

U.S. PATENT DOCUMENTS

| | | | |
|---|---|---|---|
| 3,982,392 A | | 9/1976 | Crow |
| 4,429,538 A | | 2/1984 | Sato et al. |
| 5,623,827 A | * | 4/1997 | Monty .............................. 60/748 |
| 5,941,075 A | * | 8/1999 | Ansart et al. ..................... 60/748 |
| 6,035,645 A | * | 3/2000 | Bensaadi et al. ................. 60/742 |
| 6,530,227 B1 | * | 3/2003 | Young et al. ...................... 60/776 |
| 7,114,337 B2 | * | 10/2006 | Cazalens et al. ................. 60/737 |
| 7,478,534 B2 | * | 1/2009 | Guezengar et al. ............. 60/796 |
| 7,591,136 B2 | * | 9/2009 | Bernier et al. ................... 60/800 |
| 7,673,460 B2 | * | 3/2010 | Hernandez et al. .............. 60/796 |
| 2007/0169486 A1 | * | 7/2007 | Hernandez et al. .............. 60/776 |

(Continued)

FOREIGN PATENT DOCUMENTS

EP 1 253 380 A2 10/2002

(Continued)

OTHER PUBLICATIONS

U.S. Appl. No. 12/190,105, filed Aug. 12, 2008, Commaret, et al.

(Continued)

*Primary Examiner* — William H Rodriguez
(74) *Attorney, Agent, or Firm* — Oblon, Spivak, McClelland, Maier & Neustadt, L.L.P.

(57) ABSTRACT

A device for injecting an air/fuel mixture into a combustion chamber mounted within a restricted space is disclosed. This injection device includes a bowl having an external cylindrical wall continued at its downstream end by a divergent section provided, downstream, with a collar having the form of a ring extending radially outward. The divergent section of the bowl is connected, immediately upstream of the flange, by a connecting wall to a cylindrical ring. The cylindrical ring and the connecting wall form a connection rim oriented in the upstream direction. At least one row of vortex holes is formed in the external cylindrical wall, close to its upstream end, and the connecting wall of the connection rim of the bowl is provided with a row of cooling orifices inclined axially at an angle γ to the axis of symmetry of the injection device.

15 Claims, 5 Drawing Sheets

U.S. PATENT DOCUMENTS

2007/0269757 A1* 11/2007 Commaret et al. ............ 431/265
2009/0151357 A1*  6/2009 Pieussergues et al. .......... 60/737

FOREIGN PATENT DOCUMENTS

EP    1 314 933 A1    5/2003
FR    2 753 779 A1    3/1998

OTHER PUBLICATIONS

U.S. Appl. No. 11/768,603, filed Jun. 26, 2007, Commaret, et al.
U.S. Appl. No. 11/770,309, filed Jun. 28, 2007, Guezengar, et al.

* cited by examiner

DEVICE FOR INJECTING A MIXTURE OF AIR AND FUEL, AND COMBUSTION CHAMBER AND TURBOMACHINE PROVIDED WITH SUCH A DEVICE

BACKGROUND OF THE INVENTION AND DESCRIPTION OF THE PRIOR ART

The invention is concerned with the field of turbomachines and relates to a device for injecting a mixture of air and fuel into a combustion chamber.

It relates more specifically to a novel configuration of an injection device intended to be mounted within a restricted space of a combustion chamber.

Throughout the remainder of the description, the terms "upstream" or "downstream" will be used to denote the positions of the structural elements with respect to one another in the axial direction, taking the gas flow direction as reference. Likewise, the terms "internal" or "radially internal" and "external" or "radially external" will be used to denote the positions of the structural elements with respect to one another in the radial direction, taking the axis of rotation of the turbomachine or the axis of symmetry of the structure in question as reference.

A turbomachine comprises one or more compressors delivering pressurized air to a combustion chamber in which the air is mixed with fuel and ignited so as to generate hot combustion gases. These gases flow in the downstream direction of the chamber toward one or more turbines which convert the energy thus received in order to rotate the compressor or compressors and provide the necessary work, for example, to power an aircraft.

Typically, a combustion chamber used in aeronautics comprises an internal wall and an external wall interconnected at their upstream end by a chamber end wall. The chamber end wall has, spaced circumferentially, a plurality of openings each accommodating an injection device at whose centre is positioned an injector, the assembly allowing the mixture of air and fuel to be fed into the chamber.

The combustion chamber is supplied by liquid fuel mixed with air from a compressor. The liquid fuel is fed right to the chamber by the injectors by means of which it is vaporized into fine droplets. This vaporization is initiated in the region of the injector and is continued particularly in the region of the venturi and the bowl by the effect of pressurized air from the compressor. This pressurized air passes, on the one hand, through the radial swirler or swirlers of the injection device so as to cause the fuel sprayed by the injector to rotate, and, on the other hand, through orifices formed in various parts of the injection device, such as the bowl.

As illustrated particularly in document FR 2 753 779, an injection device has a symmetry of revolution and comprises, arranged from upstream to downstream, a sliding bushing connected by an annular cup to an internal radial swirler. The internal radial swirler is itself connected to an external radial swirler by a venturi, the internal and external radial swirlers being co-rotating, that is to say that the air injected into the injection device by these two swirlers has the same direction of rotation to the axis of symmetry of the injection device. The external radial swirler is then connected by its downstream end to a bowl with a divergent conical wall. The bowl is itself connected to the chamber end wall via a deflector.

Such an injection device has a relatively large outside diameter, and therefore a relatively large bulk, which is not able to be reduced on account of the presence of certain elements such as the radial swirlers. Given its relatively large dimensions, this type of device is suited to receiving an injector of the aeromechanical type.

There are two types of injectors: aerodynamic injectors and aeromechanical injectors.

Aerodynamic injectors make it possible to inject fuel at a pressure close to that of the air which is injected at the injection device. Only one fuel supply circuit is necessary to cover the entire fuel flow range that has to be covered by the injector.

In aeromechanical injectors, the fuel is injected at a much greater pressure than the combustion chamber pressure. The vaporization of the fuel is of good quality, including when the pressure in the chamber is low. To cover the entire fuel flow range while maintaining an acceptable fuel pressure, two fuel supply circuits are necessary, resulting in an injector outside diameter which is larger than in the case of an aerodynamic injector. In spite of this larger bulk, aeromechanical injectors make it possible, inter alia, to improve fuel spraying and also combustion at a low flow rate.

If the available space for housing the injection device is small, for example in the case of smaller turbomachines, the injection device according to the prior art cannot be used because of its excessively large outside diameter. It is therefore necessary to find a novel injection device configuration that ensures at least as good a spraying quality as in the prior art and that can be housed within a small space, that is to say comply with a constraint on its outside diameter.

Moreover, since an aeromechanical injector has certain advantages, it may be advantageous or even necessary to keep this type of injector, which implies that the injection device must comply with an additional constraint on its inside diameter, this inside diameter having to be sufficiently large for an aerodynamic injector to be arranged therein.

Since the radial bulk available for the injection device is thus reduced, it is also necessary to have an effective cross section, for the flow of pressurized air through the various orifices in the injection device, equivalent to that of the prior art in terms of the effect on vaporization, so as to maintain a good spraying quality.

SUMMARY OF THE INVENTION

The object of the invention is to produce an injection device which complies with all of these constraints.

The invention makes it possible to solve this problem by providing an injection device whose configuration, geometry and supply of pressurized air are such that its outside diameter is markedly reduced with respect to the prior art, while at the same time allowing the use of an aeromechanical injector and retaining an effective cross section for the flow of pressurized air that guarantees a good spraying quality.

More specifically, the invention relates to a device for injecting a mixture of pressurized air and fuel into a combustion chamber of a turbomachine, the injection device having a symmetry of revolution about a longitudinal axis Y and comprising, arranged from upstream to downstream in the gas flow direction, a sliding bushing at the center of which is positioned an injector, an annular cup maintaining the sliding bushing axially, an internal radial swirler provided with vanes directing the pressurized air toward the inside of the injection device, a venturi, the internal radial swirler being connected by its downstream end to a bowl, the sliding bushing comprising, arranged from upstream to downstream, a convergent conical portion continuing into a cylindrical portion and terminating in an annular flange extending radially outward, the bowl comprising an external cylindrical wall extended downstream by a divergent section provided, at its downstream end, with a collar having the form of a ring extending radially outward, the divergent section of the bowl being connected, immediately upstream of the collar, by a connecting wall to a cylindrical ring, the cylindrical ring and the connecting wall forming a connection rim oriented in the upstream direction. Such an injection device is noteworthy in that at least one row of vortex holes is formed in the external cylindrical wall of the bowl close to the upstream end of the external cylindrical wall, and in that the connecting wall of the connection rim of the bowl is provided with a row of cooling orifices inclined axially at an angle γ to the axis Y of the injection device.

At least one row of purge orifices can, in addition, be formed in the sliding bushing at the location of the connection between its cylindrical portion and its annular flange.

Advantageously, the purge orifices are inclined axially at an angle α1 to the axis of the injection device, the angle α1 preferably being between 0 and 45 degrees.

The purge orifices can also be inclined in a direction tangential to the cylindrical wall of the sliding bushing at an angle β1 to the axis of the injection device. Preferably, the angle β1 is between 0 and 60 degrees.

The purge orifices and the vanes of the internal radial swirler may be co-rotating.

According to a preferred embodiment of the invention, given that the internal radial swirler has a number n of vanes, the sliding bushing has a number of purge orifices which is a submultiple of n. It may thus be advantageous to interpose the purge orifices between the vanes.

Advantageously, the vortex holes are inclined axially at an angle α2 to the axis of the injection device, the angle α2 preferably being between 30 and 90 degrees.

The vortex holes may also be inclined in a direction tangential to the external cylindrical wall of the bowl at an angle β2 to the axis of the injection device. Preferably, the angle β2 is between 0 and 90 degrees. The vortex holes and the vanes of the internal radial swirler may be co-rotating or counter-rotating.

Preferably, the cooling orifices have a downstream end arranged opposite to and substantially at the mid-height level of the collar of the bowl.

Advantageously, since the venturi has an internal surface composed of a first convergent surface connected to a second divergent surface by a connecting radius, the first convergent surface forms a cone of revolution whose axis is the axis of the injection device. The second divergent surface of the venturi may itself also form a cone of revolution whose axis is the axis of the injection device.

Moreover, the invention also relates to a combustion chamber comprising an internal wall, an external wall, and a chamber end wall, and provided with at least one such injection device.

The invention finally relates to a turbomachine provided with such a combustion chamber.

BRIEF DESCRIPTION OF THE DRAWINGS

The invention will be better understood and other advantages thereof will become more clearly apparent in the light of the description of a preferred embodiment given by way of nonlimiting example and with reference to the appended drawings, in which.

DESCRIPTION OF THE PREFERRED EMBODIMENTS

Figure 1:
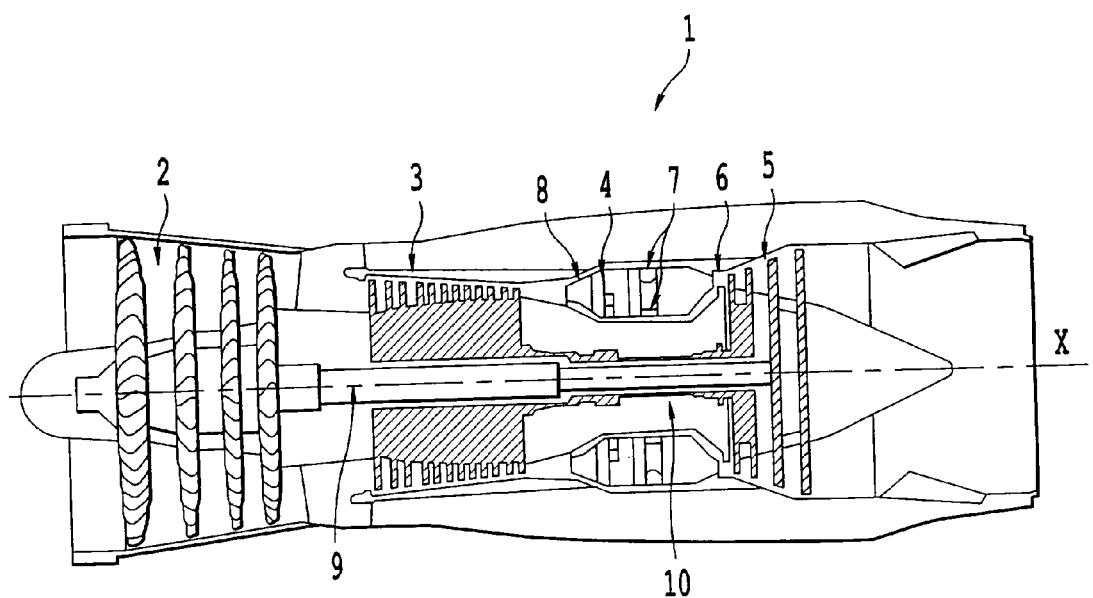
FIG. 1 is a schematic sectional view of a turbomachine, more specifically an aircraft jet engine.

FIG. 1 shows in section an overall view of a turbomachine 1, for example an aircraft jet engine, comprising a low-pressure compressor 2, a high-pressure compressor 3, a combustion chamber 4, a low-pressure turbine 5 and a high-pressure turbine 6. The combustion chamber 4 may be of the annular type and is defined by two annular walls 7 spaced radially to the axis X of rotation of the jet engine, these walls being connected at their upstream end to an annular chamber end wall 8. The chamber end wall 8 has a plurality of openings (not shown) with a regular circumferential spacing. In each of these openings is mounted an injection device. The combustion gases flow downstream in the combustion chamber 4 and then supply the turbines 5 and 6 which respectively drive the compressors 2 and 3, arranged upstream of the chamber end wall 8, by way of two respective shafts 9 and 10. The high-pressure compressor 3 supplies air to the injection devices and also to two annular spaces respectively arranged radially to the inside and outside of the combustion chamber 4. The air introduced into the combustion chamber 4 is involved in vaporizing the fuel and in its combustion. The air circulating outside the walls of the combustion chamber 2 is involved in cooling these walls and enters the chamber through dilution holes (not shown) in order to cool the combustion gases transmitted to the turbine.

Figure 2:
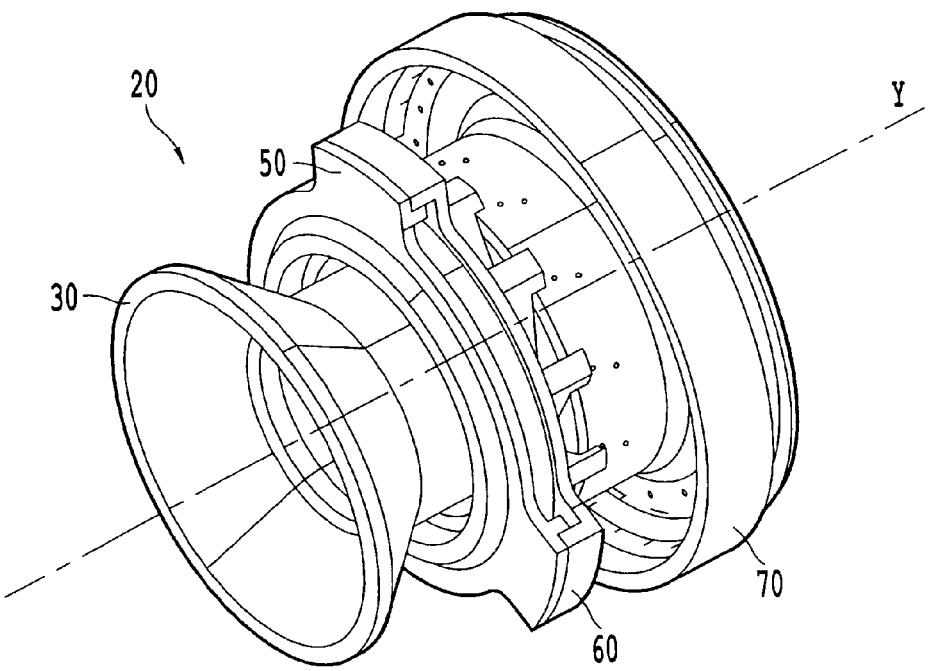
FIG. 2 is a perspective view of an injection device according to the invention.

FIG. 2 shows a perspective view of an injection device 20 according to the invention.

The injection device 20 has a symmetry of revolution of axis Y. It comprises, arranged from upstream to downstream, a sliding bushing 30 in the centre of which is positioned an injector 40 (represented in the figures below), an annular cup 50 maintaining the sliding bushing 30 axially and connecting it to an internal radial swirler 60, the internal radial swirler 60 being connected downstream to a bowl 70.

Figure 3:
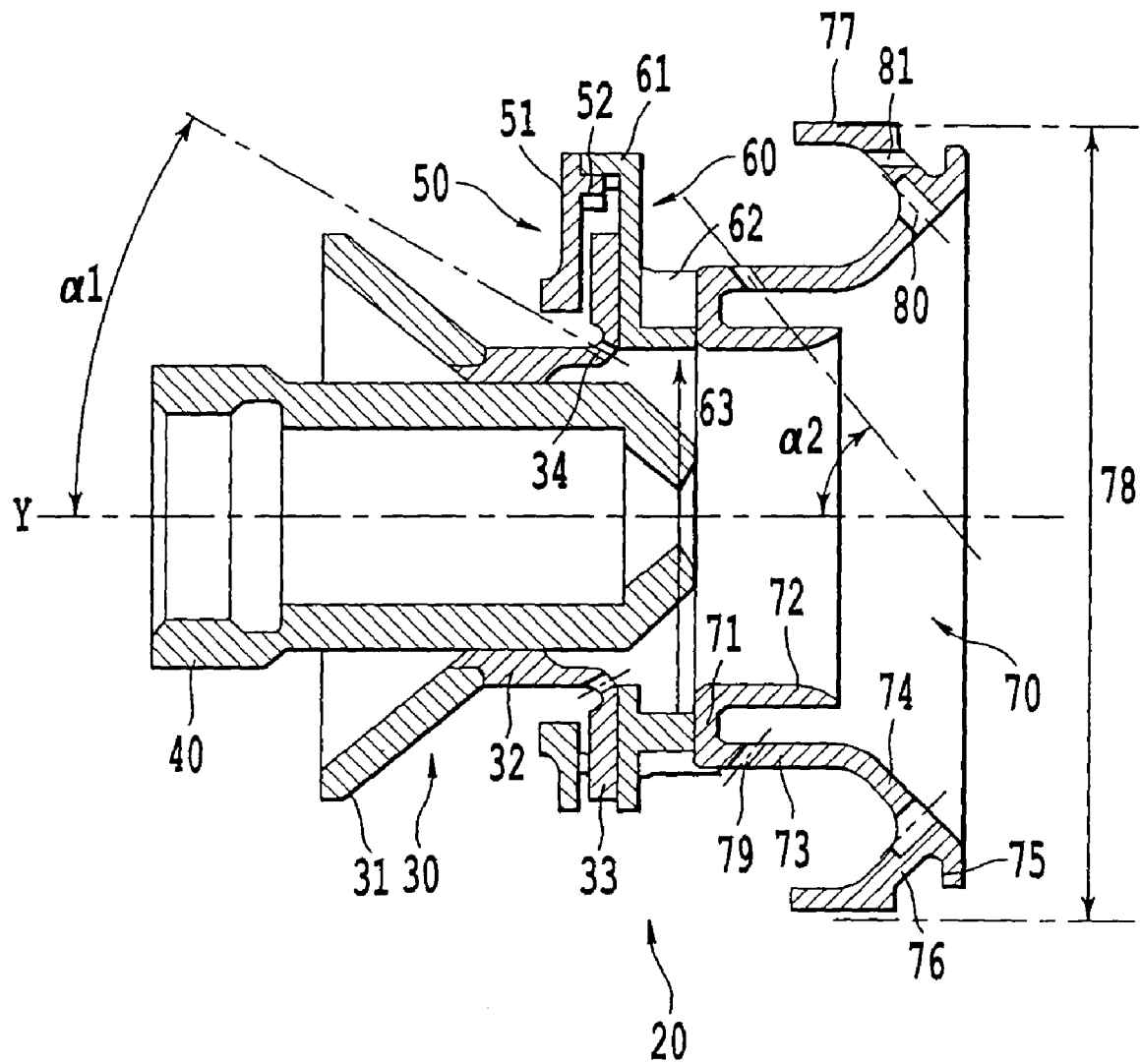
FIG. 3 is a schematic sectional view of an injection device according to the invention.

As illustrated in FIG. 3, which represents a schematic sectional view of an injection device according to the invention, the sliding bushing 30 is composed of a convergent conical upstream portion 31 continued into a cylindrical portion 32 of axis Y, this cylindrical portion being provided at its downstream end with an annual flange 33 extending radially outward. The convergent conical portion 31 is inclined at approximately 45° to the axis Y and its job is to guide the injector 40 when it is being mounted in the injection device. The sliding bushing is maintained axially by the annular cup 50 in the region of the annular flange 33. The annular cup 50 comprises an annular flange 51 extending radially outward. Its outer radial end is terminated by a cylindrical annular lip 52 of axis Y pointing in the downstream direction. The annular cup 50 is connected to an internal radial swirler 60 by way of its annular lip 52. This annular lip 52 is connected, for example by braising, to a lip 61 of corresponding shape arranged at the outer upstream end of the internal radial swirler 60. A space may be formed axially between the annular flange 51 and the internal radial swirler 60 so as to allow the radial displacement of the sliding bushing 30. This displacement makes it possible to compensate for relative movements existing during operation between the injector 40 and the injection device 20. The internal radial swirler 60 is connected by its downstream end to a bowl 70.

In the example illustrated here, the bowl 70 comprises an annular flange 71 extending radially outward. The annular flange 71 connects a first internal wall 72, also termed a venturi, to a second external cylindrical wall 73 of axis Y, by their respective upstream ends. The second external cylindrical wall 73 is continued downstream by a divergent section 74. The divergent section 74 is provided, at its downstream end, with a collar 75. The collar 75 has the form of a ring extending radially outward. Immediately upstream of the collar 75, a connecting wall 76 connects the divergent section 74 to a cylindrical ring 77 of axis Y. The connecting wall 76 may be orthogonal to the axis Y of the cooling device or inclined such that its upstream end has a larger diameter than its downstream end. The bowl 70 is connected to a deflector (not shown) by way of its cylindrical ring 77. The cylindrical ring 77 and the connecting wall 76 form a connection rim oriented in the upstream direction and the outside diameter 78 thereof corresponds to the outside diameter of the injection device 20, and determines its radial bulk.

For the purpose of supplying the injection device 20 with pressurized air, various orifices are formed therein.

Figure 4:
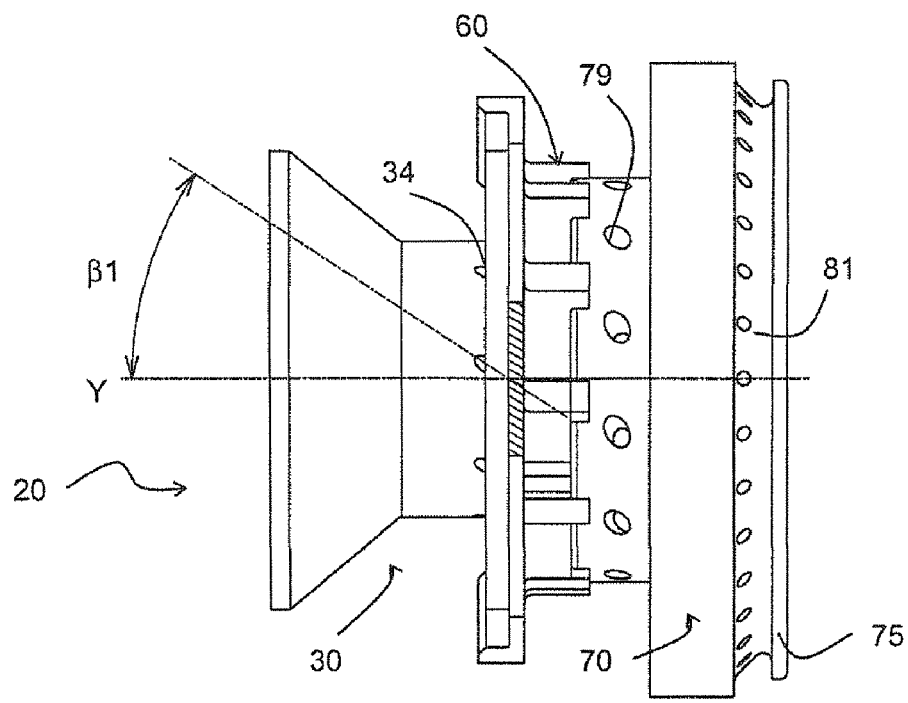
FIG. 4 is a schematic plan view of an injection device according to the invention.

The supply of air starts at the sliding bushing 30. Accordingly, at least one row of purge orifices 34 is formed in the connecting radius between the cylindrical portion and the annular flange 33. These purge orifices 34 may be produced by drilling. The downstream end of these orifices 34 is arranged such as to be positioned over a circle whose diameter is less than the inside diameter 63 of the radial swirler 60. They may be inclined at an angle α1 in the axial direction and/or at an angle β1 in the direction tangential to the cylindrical portion 32. If the purge orifices 34 are inclined, the preferred angle ranges are between 0 and 45° for the axial inclination and between 0 and 60° for the tangential inclination. The angles α1 and β1 are indicated in FIGS. 3 and 4, FIG. 4 showing a schematic side view of an injection device according to the invention. The axial inclination α1 makes it possible to control the air flow, to reduce the risks of coke formation on the downstream end of the injector 40 and allows a reduction in the radial bulk of the injection device by taking part in optimizing the desired effective air flow cross section. The axial inclination α1 additionally allows better control of the aerodynamics of the bowl. In particular, it allows better control of the start position of the recirculation zone downstream of the injector. The tangential inclination β1 makes it possible to improve the vaporization of the fuel by creating turbulence and to optimize the effective air flow cross section. This tangential inclination additionally makes it possible to increase the vortexes downstream of the injector by introducing an additional vortex flow.

Figures 5, 6:
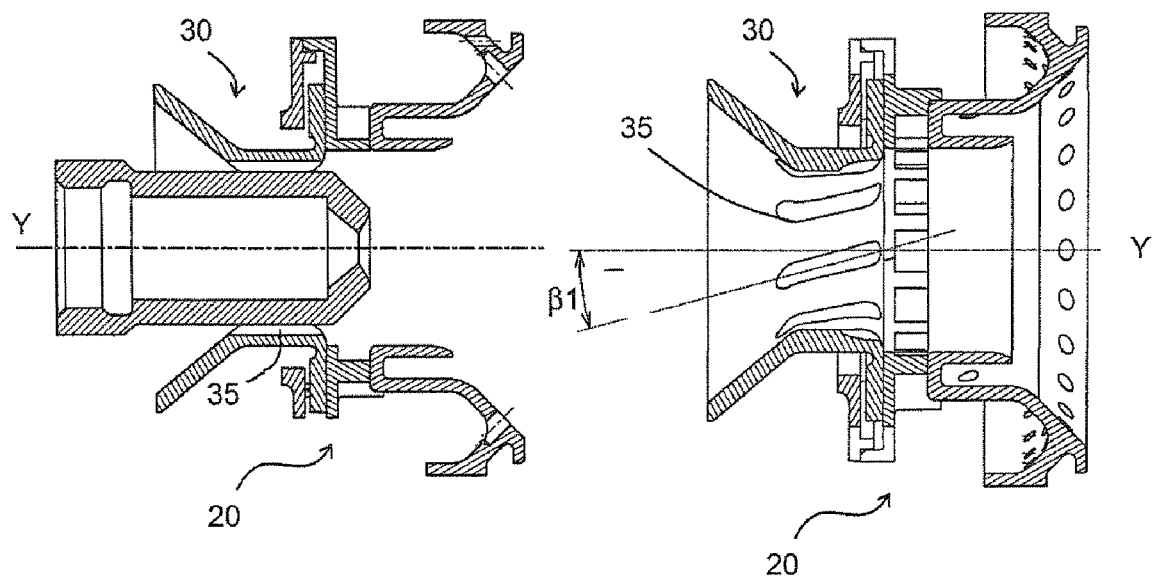
FIG. 5 is a schematic section view of an injection device according to a first variant of the invention.
FIG. 6 is a schematic sectional plan view of an injection device according to the first variant of the injection.

In the example given here, the purge orifices 34 are drilled holes, but they could just as well be produced in the form of grooves 35 arranged on the internal surface of the cylindrical portion 32, as illustrated in FIG. 5. In this case, the grooves 35 may be formed axially along the cylindrical wall 32, or by forming an angle β1 in the direction tangential to the internal surface of the cylindrical wall 32, as illustrated in FIG. 6.

Figure 7:
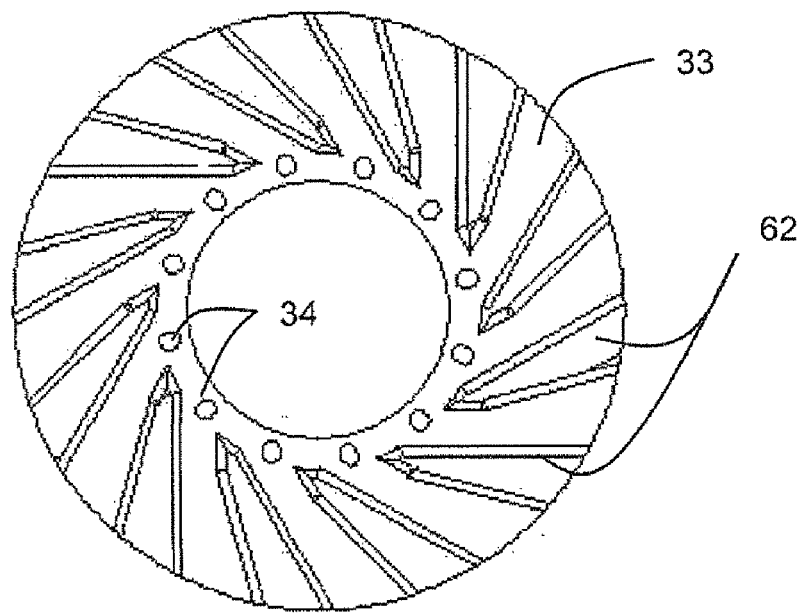
FIG. 7 is a view of part of an injection device according to the invention, viewed from downstream.

The supply of air is continued at the internal radial swirler 60. As illustrated in FIGS. 3 and 7, the internal radial swirler 60 comprises vanes 62 which direct the pressurized air toward the inside of the injection device 20 and, more precisely, toward the downstream end of the injector 40. These vanes are not oriented radially, but have a tangential inclination so as to cause the pressurized air to rotate, thereby making it possible to create a vortex flow and improve the vaporization of the fuel. Preferably, the swirler 60 and the purge orifices 34 are co-rotating, that is to say that the pressurized air leaving the purge orifices 34 and leaving the vanes 62 is caused to rotate in the same direction. Very advantageously, the number of purge orifices 34 is a submultiple of the number of vanes 62. It is thus very advantageous to interpose the purge orifices 34 between the vanes 64 of the swirler 60. This is because such an arrangement makes it possible to reduce the radial space necessary for producing, for example by drilling, these orifices. Hence, for the same inside diameter and thus the same injector diameter, the outside diameter of the swirlers 60 can be reduced.

Pressurized air is also introduced at the second external cylindrical wall 73 of the bowl 70. It is then known from the prior art to arrange, downstream of the internal radial swirler 60, an external radial swirler. The internal radial swirler 60 injects air inside the venturi 72, whereas the external radial swirler injects air between the venturi and the second external cylindrical wall of the bowl. However, the radial bowl of the external swirler has an impact on the radial bulk of the injection device and increases it considerably.

Figure 8:
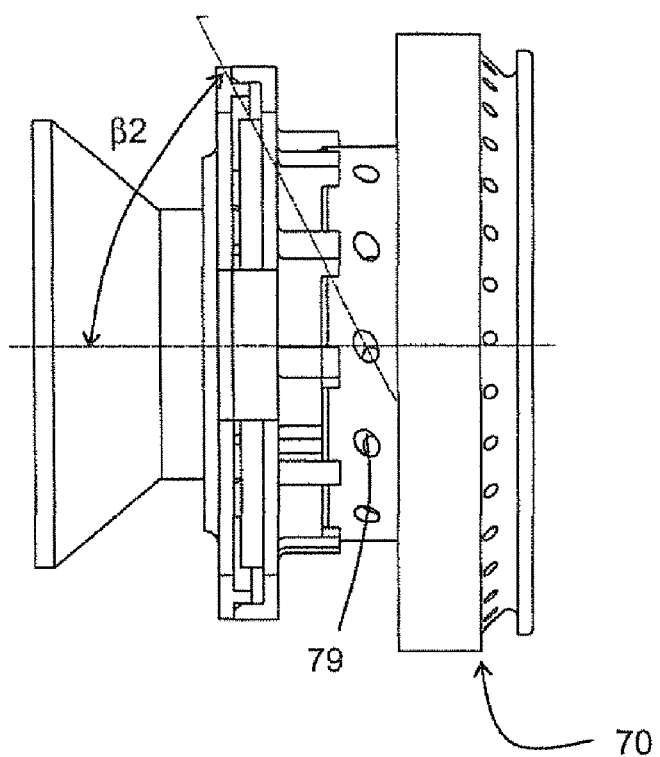
FIG. 8 is a schematic plan view of an injection device according to the invention.

As illustrated particularly in FIGS. 3 and 4, the injection device 20 according to the invention comprises, on the second external cylindrical wall 73 of the bowl 70, at least one row of vortex holes 79. The vortex holes 79 are near the upstream end of the second external cylindrical wall 73. They may be inclined in the axial direction, their axis then making an angle α2 with the axis Y. Preferably, the angle α2 is between 30 and 90 degrees. As illustrated in FIG. 8, the vortex holes may also be inclined at an angle β2 in a direction tangential to the second cylindrical wall 73. The vortex holes 79 have the same function as an external radial swirler. They may or may not be co-rotating with the internal radial swirler 60 and the purge orifices 34. If the vortex holes 79 are co-rotating with the internal radial swirler 60, the angle β2 is preferably between 0 and 90 degrees. They make it possible, on the one hand, to feed cooling air to the venturi 73 and, on the other hand, to prevent any air separation phenomena at the divergent section 74 of the bowl 70 by supplying air to the zone directly downstream of the venturi. In fact, the vortex holes 79 make it possible, within a reduced radial bulk, to reproduce the effects of a radial swirler. For the same effect, they represent a smaller effective air flow cross section, that is to say that their supply with pressurized air requires a smaller air flow rate than a radial swirler, which is beneficial to the operation of the turbomachine.

The supply of pressurized air to the injection device terminates at the divergent section 74 of the bowl 70 where, in a known manner, orifices 80 are formed.

In the region of the bowl 70, the collar 75 is directly exposed to the heat of the flame and for this reason must be cooled. Conventionally, the collar 75 is cooled by means of cooling orifices 81. Generally, these cooling orifices 81 are produced parallel to the axis Y of the injection device 20 and pass from upstream to downstream through the connecting wall 76 of the bowl 70 such that the pressurized air impacts the collar 75 in its central zone. The collar 75 then guides the air along the deflector (not shown), thus creating a cooling film.

Figure 9:
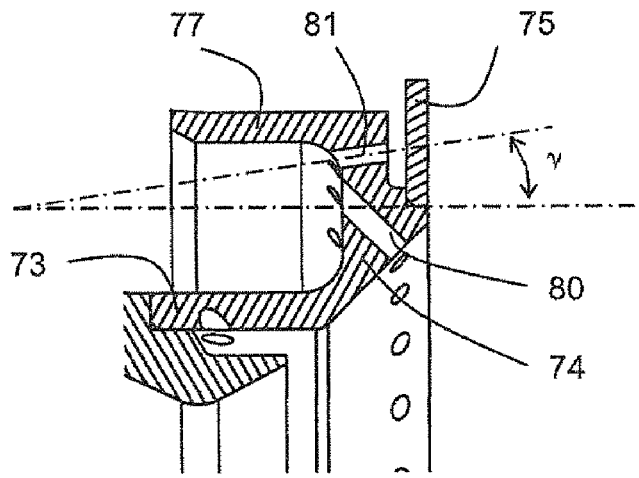
FIG. 9 is a sectional view of part of an injection device according to the invention.

In order to further reduce the radial bulk of the bowl 70 and therefore that of the injection device 20, according to the invention, the cooling orifices 81 may be formed, as illustrated in FIG. 9, in the connecting radius between the connecting wall 76 and the cylindrical ring 77 and with an inclination in the axial direction. The axis of the cooling orifices 81 thus makes an angle γ with the axis Y. The angle γ must be such that the air impacts the central zone of the collar 75. Preferably, γ is between 0 and 60°. Such an arrangement makes it possible to reduce the outside diameter of the cylindrical ring 77 while at the same time suitably directing the air for cooling the collar and the deflector.

Notwithstanding a reduced radial bulk, the injection device 20 must provide the same functions as a device of the prior art, such as providing good quality fuel spraying but also comply with certain constraints, for example ensuring that the fuel cannot flow back toward the upstream end of the injection device, in particular in the region of the radial swirler 60. Thus, in addition to the configurations cited above, which make it possible to reduce the radial bulk of the injection device while optimizing fuel spraying, it is advantageous to configure the geometry of the venturi 72.

Figure 10:
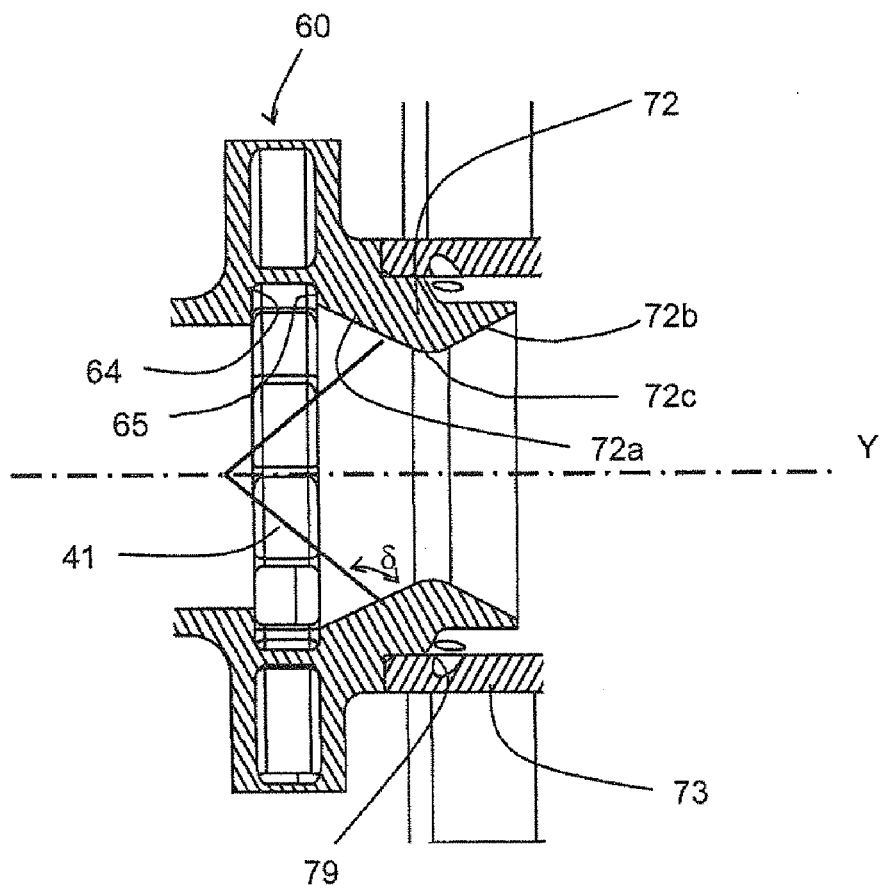
FIG. 10 is a sectional detail view of another part of an injection device according to the invention.

In the example illustrated in the figures, the venturi forms part of the bowl 70. However, and without comprising the description which has been given, it could very well be connected to the swirler 60. Such an arrangement is illustrated for example in FIG. 10. In this figure, the venturi 72 is connected by its upstream portion to the swirler 60. Its internal surface has a first convergent surface 72a connected to a second divergent surface 72b by a connecting radius 72c. The injector 40 sends into the injection device 20 a cone of fuel 41 which, depending on the operating point of the turbomachine, that is to say depending on its speed of rotation in particular, does or does not impact the venturi 72. For the operating points where the cone of fuel 41 impacts the venturi, when the fuel impacts the internal surface of the venturi, it must not be able to rebound in the direction of the swirler 60. This demands that the angle δ made between the cone of fuel 41 and the convergent conical surface 72b is obtuse. A means of having good control over this angle while limiting the bulk of the venturi is for the convergent surface 72a to be a cone of revolution of axis Y. Advantageously, the divergent surface 72b also forms a cone of revolution.

Moreover, in order to guide the flow of air from the swirler 60, upstream 64 and downstream 65 lateral walls are arranged in the continuation of the vanes 62 of the swirler 60, at their internal ends. The connection between the downstream lateral wall 65 and the convergent surface 72a is brought about by an interruption in the slope so as to prevent the fuel from flowing back into the swirler 60 by capillarity.

All the configurations according to the invention make it possible, for the same injector outside diameter, to obtain an injection device whose radial bulk is reduced while ensuring good quality of spraying and complying with the constraints on the possible flowback of fuel, particularly into the radial swirler.

The invention claimed is:

1. A device for injecting a mixture of pressurized air and fuel into a combustion chamber of a turbomachine, the injection device having a symmetry of revolution about an axis and comprising, arranged from upstream to downstream in the gas flow direction:
    a sliding bushing;
    an injector positioned in the center of the sliding bushing;
    an annular cup which maintains the sliding bushing axially;
    an internal radial swirler provided with vanes which directs the pressurized air toward the inside of the injection device;
    a venturi; and
    a bowl which is connected to a downstream end of the internal radial swirler,
    wherein the sliding bushing includes, arranged from upstream to downstream, a convergent conical portion continuing into a cylindrical portion connected to an annular flange extending radially outward,
    the bowl includes an external cylindrical wall having an upstream end and a downstream end, the downstream end of the external cylindrical wall includes a divergent section provided, downstream, with a collar having a ring extending radially outward, the divergent section of the bowl is connected, immediately upstream of the collar, by a connecting wall to a cylindrical ring, the cylindrical ring and the connecting wall present a connection rim oriented in the upstream direction,
    wherein at least one row of vortex holes is formed in the external cylindrical wall of the bowl close to the upstream end of the external cylindrical wall,
    wherein the connecting wall of the connection rim of the bowl is provided with a row of cooling orifices inclined axially at an angle γ to the axis of the injection device, the angle γ is between 0 and 60 degrees, and
    wherein the vortex holes are inclined axially at an angle α2 to the axis of the injection device, the angle α2 is between 30 and 90 degrees.

2. The injection device as claimed in claim 1, wherein at least one row of purge orifices is formed in the sliding bushing at the location of the connection between its cylindrical portion and its annular flange.

3. The injection device as claimed in claim 2, wherein the purge orifices are inclined axially at an angle α1 to the axis of the injection device, the angle α1 is between 0 and 45 degrees.

4. The injection device as claimed in claim 2, wherein the purge orifices are inclined in a direction tangential to the cylindrical wall of the sliding bushing at an angle β1 to the axis of the injection device, the angle β1 is between 0 and 60 degrees.

5. The injection device as claimed in claim 4, wherein the purge orifices and the vanes of the internal radial swirler are co-rotating.

6. The injection device as claimed in claim 2, wherein the internal radial swirler has a number n of vanes and the sliding bushing has a number of purge orifices which is a submultiple of n.

7. The injection device as claimed in claim 2, wherein the purge orifices are interposed between the vanes.

8. The injection device as claimed in claim 1, wherein the vortex holes are inclined in a direction tangential to the external cylindrical wall of the bowl at an angle β2 to the axis of the injection device, the angle β2 is between 0 and 90 degrees.

9. The injection device as claimed in claim 8, wherein the vortex holes and the vanes of the internal radial swirler are co-rotating.

10. The injection device as claimed in claim 8, wherein the vortex holes and the vanes of the internal radial swirler are counter-rotating.

11. The injection device as claimed in claim 1, wherein the cooling orifices have a downstream end arranged opposite to and substantially at the mid-height level of the collar of the bowl.

12. The injection device as claimed in claim 1, wherein the venturi has an internal surface composed of a first convergent surface connected to a second divergent surface by a connecting radius, and wherein the first convergent surface forms a cone of revolution having an axis coincident with that the axis of the injection device.

13. The injection device as claimed in claim 12, wherein the second divergent surface of the venturi forms a cone of revolution having an axis coincident with the axis of the injection device.

14. A combustion chamber comprising an internal wall; an external wall; and a chamber end wall, wherein the combustion chamber is provided with at least one injection device as claimed in claim 1.

15. A turbomachine provided with a combustion chamber as claimed in claim 14.

* * * * *